United States Patent
Chapman, IV et al.

(10) Patent No.: US 12,235,205 B1
(45) Date of Patent: Feb. 25, 2025

(54) METHODS AND SYSTEMS FOR COUPON-BASED CATHODIC PROTECTION MEASUREMENTS

(71) Applicant: Chapman Engineering, Inc., Boerne, TX (US)

(72) Inventors: Calvin C. Chapman, IV, Kerrville, TX (US); Samuel F. Williams, San Antonio, TX (US)

(73) Assignee: CHAPMAN ENGINEERING, INC., Boerne, TX (US)

( * ) Notice: Subject to any disclaimer, the term of this patent is extended or adjusted under 35 U.S.C. 154(b) by 0 days.

(21) Appl. No.: 18/593,754

(22) Filed: Mar. 1, 2024

Related U.S. Application Data

(60) Provisional application No. 63/624,396, filed on Jan. 24, 2024.

(51) Int. Cl.
*G01N 17/02* (2006.01)
*C23F 13/22* (2006.01)
*G01N 17/04* (2006.01)

(52) U.S. Cl.
CPC .............. *G01N 17/02* (2013.01); *C23F 13/22* (2013.01); *G01N 17/043* (2013.01)

(58) Field of Classification Search
CPC ........ G01N 17/02; G01N 17/043; C23F 13/22
See application file for complete search history.

(56) References Cited

U.S. PATENT DOCUMENTS

| | | | | |
|---|---|---|---|---|
| 5,216,370 A | * | 6/1993 | Bushman | C23F 13/04 204/404 |
| 5,814,982 A | * | 9/1998 | Thompson | G01N 17/02 204/404 |
| 2003/0189435 A1 | * | 10/2003 | Yunovich | G01N 17/02 324/700 |
| 2015/0002132 A1 | * | 1/2015 | Brelsford | G01N 17/046 324/71.1 |

(Continued)

OTHER PUBLICATIONS

Wikipedia Standard electrode potential (data page), downloaded Jun. 5, 2024 from https://en.wikipedia.org/wiki/Standard_electrode_potential_(data_page) (Year: 2024).*

(Continued)

*Primary Examiner* — Alexander S Noguerola
(74) *Attorney, Agent, or Firm* — Merchant & Gould P.C.

(57) ABSTRACT

Methods and systems for measuring cathodic protection of a metallic structure using a plurality of coupons, the method including electrically coupling a first coupon to the metallic structure, the first coupon being electrically connected to a reference cell and including a first material, electrically coupling a second coupon to the metallic structure, the second coupon being electrically connected to the reference cell and including a second material, electrically coupling the first coupon to the second coupon, applying a first cathodic protection current to the metallic structure, interrupting the application of the first cathodic protection current, measuring voltage between the electrically coupled first and second coupons and the metallic structure while the application of the first cathodic protection current is inter- (Continued)

rupted, and determining whether a degree of cathodic protection applied to the metallic structure is sufficient based on the measured voltage.

30 Claims, 6 Drawing Sheets

(56) References Cited

U.S. PATENT DOCUMENTS

2019/0368054 A1* 12/2019 Gummow ............... C23F 13/22

OTHER PUBLICATIONS

Lars Vendelbo Nielsen, "Application of Coupons and Probes for Cathodic Protection Monitoring Purposes", Apr. 2023, 31 pages.
NACE International, "The Use of Coupons for Cathodic Protection Monitoring Applications," ISBN 1-5790-106-X, Reaffirmed Apr. 7, 2014, 32 pages.
Cal Chapman, P.E., "Electrochemistry and Corrosion Protection (or, How Do We Keep Metal Being Metal Over Time?)", 2013, 49 pages.

* cited by examiner

METHODS AND SYSTEMS FOR COUPON-BASED CATHODIC PROTECTION MEASUREMENTS

BACKGROUND

Examples of this disclosure relate to methods and systems for measurement to evaluate and improve the cathodic protection of an underground or submerged metallic structure. Specifically, examples of this disclosure relate to methods and systems for measuring structure-to-electrolyte voltages on coupons, cathodic protection current flows, and current flow direction or polarity, on coupons, and determining DC or AC current densities on coupons. These measurements allow the practitioner to gain much more comprehensive understanding of dissimilar-metal-structure interactions, and of the cathodic protection effectiveness, and thereby to improve the cathodic protection effectiveness. In a different embodiment, the same invention allows the practitioner to evaluate the effectiveness of specialty AC power mitigation grounding systems, and other electrochemical behaviors of complex below-grade metal systems.

SUMMARY

In one aspect, the technology relates to a method of measuring cathodic protection of a metallic structure using a plurality of coupons, the method including electrically coupling a first coupon to the metallic structure, the first coupon including a first material, electrically coupling a second coupon to the metallic structure, the second coupon including a second material, electrically coupling the first coupon to the second coupon, applying a first cathodic protection current to the metallic structure, interrupting the application of the first cathodic protection current, measuring a first voltage of the first coupon with respect to a reference cell, while the application of the first cathodic protection current is interrupted, measuring a second voltage of the second coupon with respect to the reference cell while the application of the first cathodic protection current is interrupted, measuring a third voltage between the electrically coupled first and second coupons and the metallic structure while the application of the first cathodic protection current is interrupted with respect to the reference cell, and determining whether a degree of cathodic protection applied to the metallic structure is sufficient based on the measured third voltage.

In an example, the method further includes measuring a structure-to-electrolyte voltage between the structure and another reference cell at a second location of the structure, calculating a difference between the structure-to-electrolyte voltage and the third voltage, and determining a level of cathodic protection of the structure at the second location based on the calculated difference. In another example, measuring the third voltage is performed within a given period of time after interrupting the application of the first cathodic protection current. In a further example, the given period of time is in a range of 0.1 second to 0.5 second. In yet another example, the measured third voltage is a DC voltage. In a further example, when the measured third voltage is equal to or more negative than −0.850 V, the degree of cathodic protection is determined to be sufficient. In other examples, when the measured third voltage is more positive than −0.850 V, the method further includes applying a second cathodic protection current to the metallic structure, the second cathodic protection current being greater than the first cathodic protection current. In an example, applying the second cathodic protection current includes applying a stepwise increase in the second cathodic protection current compared to the first cathodic protection current.

In another example of the above aspect, the method further includes interrupting the application of the second cathodic protection current, and measuring a second voltage between the electrically coupled first and second coupons and the reference cell. In another example, measuring the second voltage is performed within a given period of time after interrupting the application of the second cathodic protection current. In a further example, the given period of time is in a range of 0.1 second to 0.5 second. In yet another example, the first material includes a same material as a material of the metallic structure. In other examples, the second material includes one of a more noble material and a less noble material than the first material.

In another aspect, the technology relates to a method of measuring an effectiveness of cathodic protection applied to a metallic structure using a plurality of coupons, the method including electrically coupling a first coupon and a second coupon to the metallic structure, the first coupon and the metallic structure including a first material, and the second coupon including a second material that is one of less noble and more noble than the first material, applying a first cathodic protection current to the metallic structure, contemporaneously measuring a polarity and magnitude of a first current flowing between the coupled first coupon and the metallic structure, contemporaneously measuring a polarity and magnitude of a second current flowing between the coupled second coupon and the metallic structure, and determining whether a degree of cathodic protection of the metallic structure is sufficient based on the determined polarity and magnitude of the first current and the determined polarity and magnitude of the second current.

In an example of the above aspect, the degree of cathodic protection is determined to be sufficient when the polarity and magnitude of the first current is substantially equal to the polarity and magnitude of the second current. In a further example, applying the first cathodic protection current includes applying a plurality of stepwise increases in the first cathodic protection current, and measuring the polarity and magnitude of the first current includes measuring the polarity and magnitude of the first current for each stepwise increase. In yet another example, measuring the magnitude of the first current includes determining a first current density based on the measured magnitude of the first current, and measuring the magnitude of the second current includes determining a second current density based on the measured magnitude of the second current. In further examples, the method further includes calculating a difference between the first current density and the second current density. In yet another example, when the calculated difference between the first current density and the second current density is equal to or less than the absolute value of 10% of the first current density, the degree of cathodic protection of the metallic structure is determined to be sufficient.

In another example, when the difference between the first current density and the second current density is greater than 10%, the method further includes applying a second cathodic protection current to the metallic structure, the second cathodic protection current being greater than the first cathodic protection current. In other examples, applying the second cathodic protection current includes applying a stepwise increase in the second cathodic protection current compared to the first cathodic protection current.

In other examples, the method further includes contemporaneously measuring a magnitude of a third current flowing between a third coupon and soil, the third coupon being unconnected to the metallic structure, to the first coupon and to the second coupon, and including the first material, contemporaneously measuring a magnitude of a fourth current flowing between a fourth coupon and soil, the fourth coupon being unconnected to the metallic structure, to the first coupon and to the second coupon, and including the second material, and determining whether a degree of cathodic protection of the metallic structure is sufficient based on one of the determined magnitude of the third current and the determined magnitude of the fourth current. For example, the degree of cathodic protection of the metallic structure is deemed sufficient when the determined magnitude of the third current and the determined magnitude of the fourth current are substantially equal to zero.

In yet another example, an arrangement for measuring cathodic protection of a metallic structure includes a first coupon electrically coupled to the metallic structure via at least one switch, the first coupon being electrically connected to a reference cell and including a first material, a second coupon electrically coupled to the first coupon and to the metallic structure via at least one switch, the second coupon being electrically connected to the reference cell and including a second material, a current source configured to apply a cathodic protection current to the metallic structure, and a voltage measuring device configured to measure a voltage between the coupled first and second coupons and the metallic structure with reference to the reference cell. In a further example, the first material includes a same material as a material of the metallic structure. For example, the first material includes one of carbon steel, ductile iron, and aluminum. As another example, the second material includes a different material than the material of the metallic structure. As a further example, the second material includes a material that is more noble than the material of the metallic structure. As yet another example, the second material includes one of copper, stainless steel alloy, and a nickel/chromium alloy.

In another aspect, the technology relates to a cathodic protection system including the above arrangement, a processor coupled to the arrangement, a memory coupled to the processor, the memory storing instructions that, when executed by the processor, performs a set of operations including applying, via the current source, the first cathodic protection current to the metallic structure, interrupting, via the processor, the application of the first cathodic protection current, measuring, via the voltage measuring device, the voltage, and determining, via the processor, whether a degree of cathodic protection of the metallic structure is sufficient based the measured voltage. In an example, when the measured third voltage is equal to or more negative than −0.850 V, the degree of cathodic protection is determined to be sufficient. In a further example, when the measured voltage is more positive than −0.850 V, the set of operations further includes applying a second cathodic protection current to the metallic structure, the second cathodic protection current being greater than the first cathodic protection current. In a further example, the set of instructions further includes interrupting the application of the second cathodic protection current, and measuring a second voltage between the electrically coupled first and second coupons and the metallic structure. In yet another example, the arrangement further includes a current measuring device configured to measure a first current density flowing between the coupled first and second coupons and the metallic structure, and a third coupon in the soil and unconnected to the metallic structure, the third coupon including the first material, wherein the current measuring device is further configured to measure a second current density flowing between the third coupon and soil.

In another aspect, the technology relates to a cathodic protection system including the above arrangement, a processor coupled to the arrangement, a memory coupled to the processor, the memory storing instructions that, when executed by the processor, performs a set of operations including applying, via the current source, the cathodic protection current to the metallic structure, contemporaneously measuring, via the current measuring device, the first current density, contemporaneously measuring, via the current measuring device, the second current density, determining, via the processor, whether a degree of cathodic protection of the metallic structure is sufficient based on the measured first current density and the measured second current density.

In an example of the above aspect, the second material is a material that is more noble than the first material. In a further example, the set of operations further includes calculating a difference between the first current density and the second current density. In other example, when the calculated difference between the first current density and the second current density is equal to or less than 10% of the first current density, the degree of cathodic protection of the metallic structure is determined to be sufficient. In a further example, when the difference between the first current density and the second current density is greater than 10% of the first current density, the set of operations further includes applying a second cathodic protection current to the metallic structure, the second cathodic protection current being greater than the first cathodic protection current.

In another aspect, the technology relates to a method of measuring a flow of AC current from a metallic structure to an electrical grounding structure using a plurality of coupons coupled to a stationary reference cell, the method including mounting a first metal coupon and a second metal coupon on a coupon reference cell, placing the coupon reference cell adjacent to the metallic structure, the first coupon being electrically connected to ground and including a first material, the second metal coupon being electrically connected to the ground and including a second material, measuring an AC current flow of the first coupon and of the second coupon, determining a first current density and a second current density based on the measured first current flow and second current flow, respectively, comparing the measured AC current flow of the first coupon and the determined first current density to the measured AC current flow of the second coupon and the determined second current density, and determining which of the first coupon and the second coupon represents a lower-electrical-resistance grounding structure based on the comparison.

In an example of the above aspect, the method further includes before electrically coupling the first coupon and the second coupon measuring a third current flowing to the first coupon and a fourth current flowing to the second coupon, and determining a third current density based on the measured third current and a fourth current density based on the measured fourth current. In another example, the method further includes, before electrically coupling the first coupon and the second coupon applying a current to the second coupon such that the third current density and the fourth current density are substantially equal to each other. In yet another example, a difference between the third current density and the fourth current density is 10% or less.

DETAILED DESCRIPTION

Figure 1:
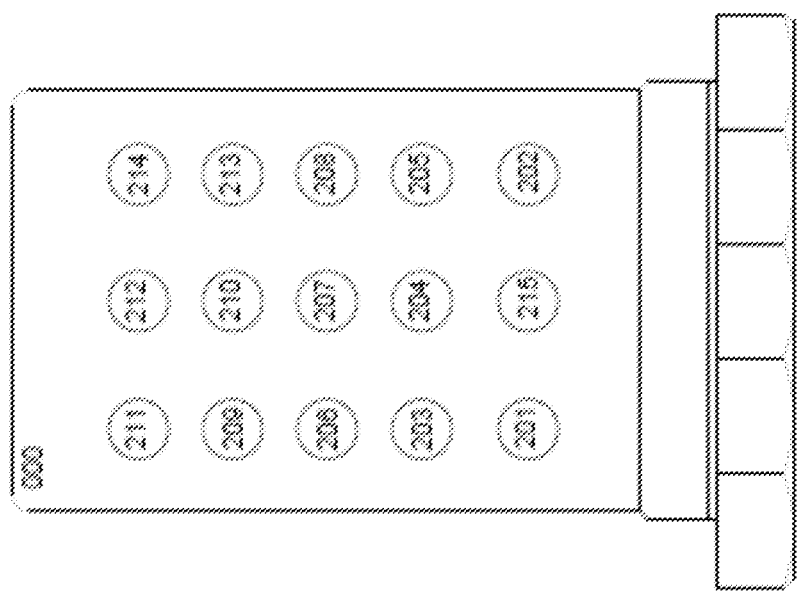
FIG. 1 is a schematic diagram of a test head terminal block, in accordance with various examples of the disclosure.

Cathodic protection measurements on underground or submerged pipelines for crude oil, natural gas, refined products, petrochemical, water pipelines, bulk storage tanks, and the like, often include corrosion influences from dissimilar-metal contacts, e.g., contacts between different, or dissimilar, metals, contacts with electrical grounding systems, and even contacts with the regional AC power grid copper neutral system. These mixed-metal potential differences or voltages may cause substantial challenges in determining whether adequate cathodic protection is being applied to control external corrosion rates on exposed metal surfaces in electrolyte contact. The metal structures could be buried in soils on land or operate in submerged conditions, related to river crossings, lake crossings and even open ocean environments. In some cases, the reactions may take place on internal tank or vessel metal surfaces, and measurement devices are needed on the insides of such vessels.

Stationary reference cell technology has been used for the past 15 years or more, and often includes a set of metal coupons installed on the reference cell body (see U.S. Pat. No. 9,804,078). Such devices are typically called stationary coupon reference cells, or permanent coupon reference cells. The metal coupons in most cases are made of carbon steel, similar in metallurgy to welded steel pipeline metal, and to bulk above-ground storage tank (AST) bottom plate steel, but may also be made of ductile iron, when the metal structures being studied for corrosion processes and risk are also made of ductile iron. Some coupon materials may include 316 stainless steel. In examples, all existing coupon reference cells described herein are made using a single type of metal coupon.

Examples of this disclosure thus provide not just one type of metal coupons on the stationary reference cell body, but two or more different metal coupon types. As an example, in the on-land corrosion control industry, there are many situations in which the copper neutral system of the AC power grid becomes electrically joined to buried pipeline metal, bulk AST external bottom metal, and other buried metal structures such as, e.g., reinforcing steel in concrete footings and foundations, structural steel piling, steel equipment skids set on soils, pipe rack metal supports drilled or otherwise placed into soils, and the like, in facilities such as e.g., refineries, natural gas compression stations, petrochemical plants, water treatment plants, and the like. Because copper is a better electrical conductor compared to carbon steel, and to most other industrial metals from which pipelines and other subsurface structures may be built, copper becomes a desired metal to which cathodic protection current is applied, with the electrically connected carbon steel pipelines and storage tank bottoms suffering a reduced application of cathodic protection current. Copper is more electrochemically noble or passive than carbon steel, and as a result does not usually require cathodic protection to resist in-soil external corrosion. However, copper receives the cathodic protection in preference to carbon steel surfaces based on copper being far more electrically conductive than the carbon steel. These factors commonly lead to under-protection of the underground carbon steel structures for which the cathodic protection current is actually intended. Copper also typically does not electrochemically polarize very strongly over time, whereas carbon steel achieves good electrochemical polarization when enough protective current has been, or is being, delivered. For carbon steel that is not joined to copper or another more noble metal, this polarization effect reduces the amount of protective cathodic protection current needed once polarization has occurred. As a result, bare copper surfaces continuously receive large quantities of cathodic protection current, reducing the amount of protective current that electrically joined carbon steel metal can ever receive. That current is then transmitted through the AC neutral wire grid along a current return flow path to the particular cathodic protection system involved. None of this current flow provides protection to the intended metal structures, most commonly formed of carbon steel.

In various examples, using a stationary reference cell, as further discussed below, may substantially improve the ability of the corrosion control industry personnel to recognize dissimilar-metal interactions, to gauge the prevalence and severity of the interactions including overprotection conditions, and to properly mitigate the interactions when possible. This may significantly reduce the cost of the sizing, installation and operation of cathodic protection systems, and may more clearly identify the need for installation of electrical decoupling devices sometimes used to break electrical connections between copper and steel structures for DC current flows. Examples of this disclosure may also provide more targeted, better quality cathodic protection applications to many buried or submerged metallic structures.

In various examples of the current disclosure, the coupons built into stationary reference cells may be put together in pairs, so that a first coupon can receive cathodic protection current. The second metal coupon, made of an identical metal as the first coupon, is not provided cathodic protection, and the second coupon may remain in an unprotected, or native, electrochemical condition. Cathodic protection effectiveness may be measured as a direct-current (DC) voltage magnitude and polarity, or as the potential difference between the metal structure surface in soil contact and the actual reference cell placed in soil or other electrolyte (fresh water, brackish water or salt water, for instance) contact. For most applications in soils and fresh water, the applicable reference cell may include a copper rod immersed in copper sulfate ion solution and deionized water, all of which being surrounded by a semi-permeable membrane. For brackish and saltwater exposures, the applicable reference cell may include a silver rod immersed in a silver chloride ion solution and deionized water mixture, all surrounded by a semi-permeable membrane.

When the copper-copper sulfate reference cell is used, three measurement criteria may be relied on to estimate whether a buried or submerged carbon steel structure is receiving adequate cathodic protection. The first criterion of the three measurement criteria, referred to herein as Criterion I, includes using a cathodic protection current continuously applied to the metal surfaces in electrolyte contact, where the potential difference, measured as a DC voltage, between the metal surface of the submerged carbon steel structure and a reference cell is −0.850 V or more negative, e.g., −0.850V, −0.900 V and the like. This Criterion I measurement may be performed after any "IR drop" voltage contributions have been removed from the original measurement. IR drops are the artificial voltages created by the distance that measurement circuit current travels through soils or other electrolyte path, by that same current traveling across contact resistances between the steel surface and soil/other electrolyte interface, the touch point of meter wiring to the reference cell lead wire, and the measurement current traveling through wire paths which complete the measurement circuit. One benefit of a stationary reference cell is that the stationary reference cell is buried substantially close to the structure being tested, thus reducing the IR drop contribution from a soil/electrolyte path length in comparison to a portable reference cell being placed very close to ground or other electrolyte surface, and farther from the structure.

The second criterion of the three measurement criteria, referred to herein as Criterion II, is measured within about one-quarter of a second (0.25 s) or less after the cathodic protection current flow has been temporarily interrupted to the buried or submerged structure being protected. In other words, the cathodic protection current is interrupted, and the Criterion II measurement is performed substantially immediately thereafter. When the cathodic protection of the buried/submerged structure is sufficiently protected, the measured "instant-off" or current-interrupted voltage may be −0.850 V DC or less (more negative), e.g., −0.850V, −0.900 V and the like. A benefit of current interruption is that substantially all the IR drop voltage contributions disappear from the measurement, since cathodic protection current is no longer flowing.

The third criterion of the three measurement criteria, referred to herein as Criterion III, is referred to as the polarization shift comparison. Criterion III relies on two different cathodic protection voltage measurements, wherein the current-interrupted voltage that is obtained during Criterion II as described above is compared to a native or depolarized structure-to-electrolyte voltage. The native voltage may be obtained either from the same structure after cathodic protection was turned off for a period of days to weeks, or by measuring the voltage on a piece of native coupon metal that is similar or identical to the material of the buried or submerged structure to be protected in the same type of electrolyte or soil and substantially close to the submerged structure. However, the native coupon is not electrically connected to buried/submerged structure or to the source of cathodic protection. The goal of Criterion III is to establish whether the difference between the current-interrupted voltage and the native or unprotected voltage is 100 millivolts (0.1 V) DC or greater. Criterion III is particularly valuable for old, poorly coated steel pipelines, or for bare carbon steel tank bottom external metal surfaces. Bare steel structures in soils or water typically require far greater amounts of cathodic protection current to be applied continuously, and do not obtain the same degree of electrochemical protection, expressed by more negative structure-to-electrolyte voltages, compared to well-coated steel structures. Criterion III is not typically considered to be practical for application when dissimilar-metal contacts, which include carbon steel, are present in a structure or set of structures. It is, however, often used as an acceptable criterion for the cathodic protection of copper, or of stainless steel, when they are not connected with dissimilar metals. The device and methods described herein offer new ways to do such measurement and data interpretation and will allow much better consideration of this particular criterion with respect to dissimilar-metal interactions and especially for carbon steel structures joined with other metals.

Coupons made of other metals that are dissimilar compared to the underground structure to be cathodically protected may also be used. For example, buried stainless steel pipelines, commonly of 304 or 316 stainless steel, are used in many petrochemical and refinery plant settings, and in other industrial settings as well. These stainless steel pipelines, although typically coated with high-dielectric-strength materials, typically cause interactions with carbon steel and even copper underground structures, because the stainless steel metal, when exposed to electrolyte contact, is more cathodic than either copper or carbon steel. Coupon reference cells according to the current disclosure may help confirm the presence of the dissimilar-metal interactions, measure the degrees of interaction based on coupon voltages found, and compare the DC currents flowing to and from each particular coupon. Another substantial risk to stainless steel metal pipelines is that of cathodic over-protection. Stainless steel structures placed in underground or submerged service are susceptible to cathodic protection (CP) over-protection, which may cause hydrogen-assisted cracking in the metal. This is especially concerning when impressed-current cathodic protection is applied to mixed-metal systems in complex facilities, which often include carbon steel, copper and stainless steel structures electrically joined. When a cathodic protection system is used to protect large carbon steel structures in buried or submerged service, the protection delivered to the carbon steel surfaces may be so strong that nearby stainless steel may suffer hydrogen embrittlement damage. Measurements of native stainless steel voltages can be used in comparison to the CP-applied and current-interrupted voltages, and then be compared to the carbon steel coupons, the copper coupons and the other metals in use. A CP practitioner may more quickly and effectively recognize the over-protection risk imposed on the stainless steel structure, and mitigation steps can be implemented. Similarly, other structures susceptible to cathodic over-protection such as American Water Works Association C301 pre-stress-wire-wrapped, reinforced concrete steel cylinder pressure pipe may be evaluated using the same approach, whether associated with dissimilar metals or not. The present invention may also allow accurate measurement and improved evaluation of such over-protection risks for stainless steel and other at-risk metallic structures in underground or submerged services.

A coupon set to be used for vessels and tanks in water treatment plants may also include carbon steel and aluminum coupon pairs and may be combined with a copper coupon or other metal pair. Many vessels and tanks for water supply are built using aluminum, and the dissimilar-metal contacts of aluminum with steel, with copper, and with ductile iron (commonly used for buried water pipeline work) may cause the more electrochemically active aluminum to corrode as the anode in each of these dissimilar-metal pairs. Aluminum also exhibits significantly increased corrosion rates at water pH levels outside a range of about 4 to 8.5. The aluminum coupons may be monitored in comparison to the other metal coupons, for current flows and voltages, to show when the aluminum is electrochemically more anodic and under increased corrosion attack.

In each coupon reference cell setup described in examples of this disclosure, switching may be provided to allow the joining of two or more current-interrupted coupons, and/or of the native coupons, so that the mixed-metal behaviors of each dissimilar-metal group may be temporarily monitored. Another example includes permanently joining dissimilar metal coupons to one another, so that the mixed-metal voltages may be measured continuously. This may show the slow voltage changes that arise from changing soil moisture conditions, soil temperature conditions, spring and summer growing-season soil conditions versus fall and winter no-growth or less-growth soil conditions, and the like. It may also show the voltages to be very similar to the nearby metal structure complex, which also includes joined carbon steel and copper metals in the electrolyte, for example. Examples of this disclosure include an improved stationary coupon reference cell device, and the example methods disclosed herein allow for improving the interpretation and understanding of dissimilar-metal interactions, and thereby improving cathodic protection of below-grade metal assets.

FIG. 1 is a schematic diagram of a test head terminal block, in accordance with various examples of the disclosure. In FIG. 1, the test head terminal block 000 is a system that encompasses various terminals that may be used to test and effectively monitor the adequacy of cathodic protection being applied to a metallic structure, e.g., cathodically protect an underground or submerged metallic structure. The test head terminal block 000 may include a plurality of terminals such as, e.g., structure terminals 201 and 202, which are coupled to the underground or submerged structure. For example, the underground or submerged structure may be a pipeline or other underground or submerged metallic structure. Terminals 203-210 are test terminals that include substantially a single metal. The metals in each of terminals 203-210 may be the same or different from each other, but the metal in each terminal is a single metal such as, e.g., copper, or stainless steel. Terminals 211 and 212 are mixed-metal terminals, e.g., terminals that include more than one metal. Terminals 213 and 214 a metal native terminals, e.g., terminals that are unconnected to the underground or submerged structure to be protected. Terminal 215 is a reference cell terminal, e.g., a terminal connected to a reference cell. The reference cell may be used to, e.g., measure voltages of the underground or submerged structure.

Figure 2:
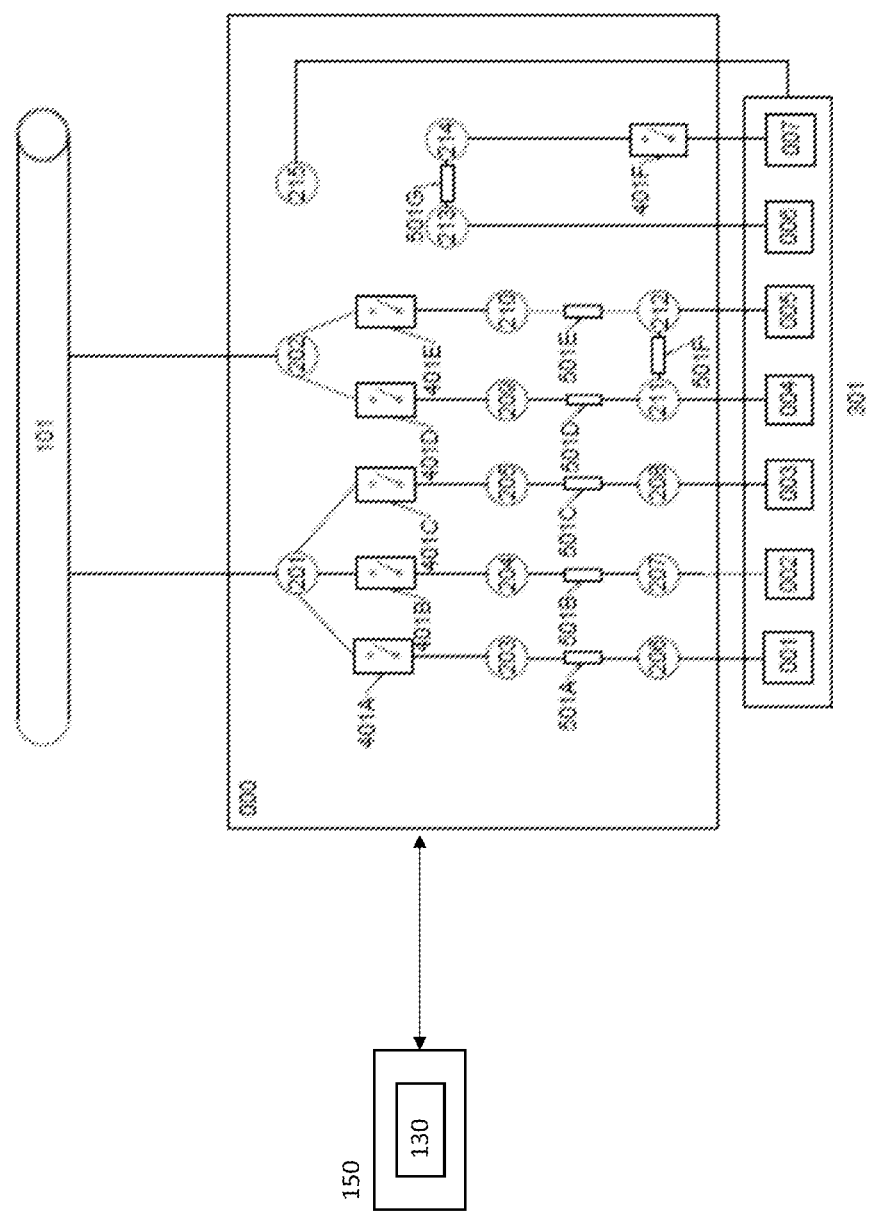
FIG. 2 is a schematic diagram of a cathodic protection measurement circuit, in accordance with various examples of the disclosure.

FIG. 2 is a schematic diagram of a cathodic protection measurement circuit, in accordance with various examples of the disclosure. FIG. 2 illustrates a circuitry connecting various elements from the test head terminal block 000 illustrated in FIG. 1, the test head terminal block 000 being coupled to the structure 101 that is, e.g., the underground or submerged structure to be cathodically protected such as, e.g., an underground or submerged metallic pipeline or other structure. FIG. 2 also illustrates a plurality of metal test coupons 001-007 housed on a reference cell 301. As such, voltages at each of the metal test coupons 001-007 may be measured with respect to the reference cell terminal 215 that is connected to the reference cell 301. In the example configuration illustrated in FIG. 2, the metal test coupon 001 is electrically coupled to metal test terminals 206 and 203 in series, and then to the structure terminal 201 via the metal test terminals 206 and 203. The metal test terminals 206 and 203 are electrically coupled to one another via inline resistor 501A, at which current flow and polarity (direction of DC current travel) can be measured, and the metal test terminal 203 and the structure terminal 201 are coupled together via switch 401A which may turned on and off. Accordingly, the connection between the metal test terminal 203 and the structure terminal 201 can be controlled and turned on and off as desired.

Similarly, the metal test coupon 002 is electrically coupled to metal test terminals 207 and 204 in series, and then to the structure terminal 201 via the metal test terminals 207 and 204. The metal test terminals 207 and 204 are electrically coupled to one another via inline resistor 501B, at which current flow and polarity can be measured, and the metal test terminal 204 and the structure terminal 201 are coupled together via switch 401B. Accordingly, the connection between the metal test terminal 203 and the structure terminal 201 can be controlled and turned on and off as desired. The metal test coupon 003 is electrically coupled to metal test terminals 208 and 205 in series, and then to the structure terminal 201 via the metal test terminals 208 and 205. The metal test terminals 208 and 205 are electrically coupled via inline resistor 501C, at which current flow and polarity can be measured, and the metal test terminal 205 and the structure terminal 201 are coupled together via switch 401C. Accordingly, the structure terminal 201 may be coupled to any one or more of the metal test coupons 001, 002 and 003 by closing or opening any one or more of the switches 401A, 401B and 401C. As a result, the submerged or underground structure to be protected 101 may be electrically coupled to any one of the metal test coupons 001, 002 and 002 by opening or closing any one or more of the switches 401A, 401B and 401C. Based on the circuitry illustrated in FIG. 2, various dynamic measurements may be performed between the metal test terminals 203-208, the metal test coupons 001-003, and the structure 101.

FIG. 2 also illustrates that the metal test coupon 004 is electrically coupled to metal test terminals 211 and 209 in series and then to the structure terminal 202 via the metal test terminals 211 and 209. The metal test terminals 211 and 209 are electrically coupled to one another via inline resistor 501D, at which current flow and polarity can be measured, and the metal test terminal 209 and the structure terminal 202 are coupled together via switch 401D. The metal test coupon 005 is electrically coupled to metal test terminals 212 and 210 in series and then to the structure terminal 202 via metal test terminals 212 and 210. The metal test terminals 212 and 210 are electrically coupled to one another via inline resistor 501E, at which current flow and polarity can be measured, and the metal test terminal 210 and the structure terminal 202 are electrically coupled together via switch 401E. In this configuration, the metal test terminals 212 and 211 are electrically coupled together via inline resistor 501F at which current flow and polarity can be measured. As a result of this configuration, any one of the metal test coupons 004 and 005 may be coupled to the structure terminal 202, and ultimately to the underground structure 101, via activation of switches 401D and 401E. In addition, due to the inline resistor 501F connecting metal test terminals 212 and 211, both of the metal test coupons 004 and 005 may be concurrently coupled to the structure terminal 202 and to the underground structure 101.

FIG. 2 further illustrates that the metal test coupon 006 is electrically coupled to metal native terminal 213 which remains unconnected to the structure 101, and the metal test coupon 007 is electrically coupled to metal native terminal 214 via switch 401F. The native terminals 213 and 214 may not include the same metal, and are electrically coupled together via inline resistor 501G, at which current flow and polarity can be measured. Neither of the metal test coupons 006 and 007 are connected to the underground structure 101. Accordingly, any voltage measured at either one of the native terminals 213 and 214 is reflective of the interaction of each terminal with the ground or medium in which the structure 101 is buried or submerged.

Figure 3:
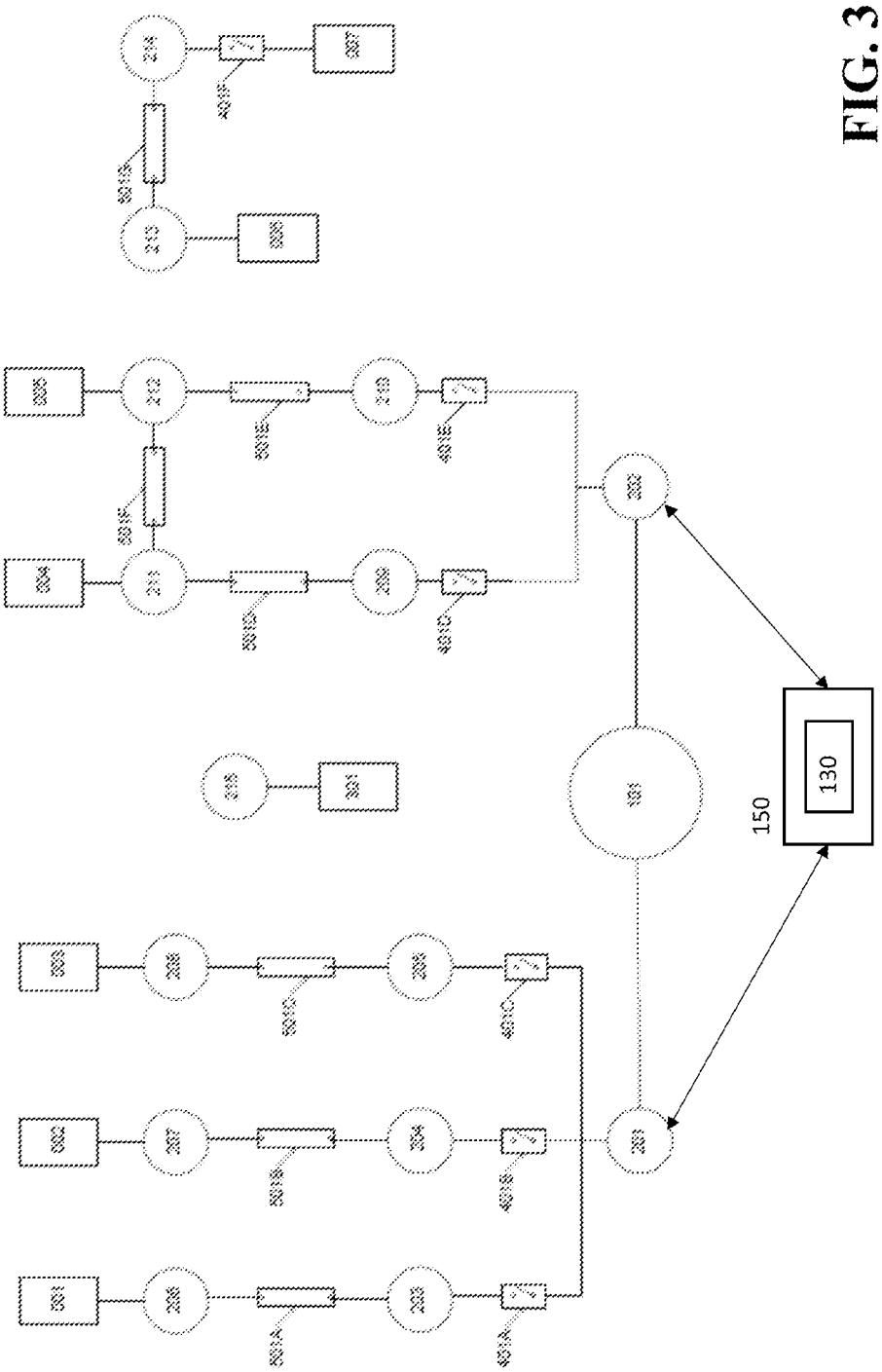
FIG. 3 illustrates another example configuration of a cathodic protection measurement circuit, in accordance with various examples of the disclosure.

FIG. 3 illustrates another example configuration of a cathodic protection measurement circuit, in accordance with various examples of the disclosure. In FIG. 3, the underground structure 101 is electrically coupled to structure terminals 201 and 202, and each structure terminal 201 and 202 is coupled to a given circuit. In an example, structure terminal 201 is electrically coupled to metal test coupons 001, 002 and 003 via a plurality of inline resistors 501A, 501B and 501C, at which current flow and polarity can be measured, respectively, and a plurality of switches 401A, 401B and 401C, respectively. Specifically, structure terminal 201 is coupled to metal test coupon 001 via metal test terminals 203 and 206, where metal test terminal 203 is coupled to the structure terminal 201 via switch 401A and to metal test terminal 206 via inline resistor 501A. Similarly, structure terminal 201 is coupled to metal test coupon 002 via metal test terminals 204 and 207, where metal test terminal 204 is coupled to the structure terminal 201 via switch 401B and to metal test terminal 207 via inline resistor 501B. Structure terminal 201 is also coupled to metal test coupon 003 via metal test terminals 205 and 208, where metal test terminal 205 is coupled to the structure terminal 201 via switch 401C and to metal test terminal 208 via inline resistor 501C.

In another example, structure terminal 202 is electrically coupled to metal test coupons 004 and 005 via a plurality of inline resistors 501D and 501E, respectively, and switches 401D and 401E, respectively. Specifically, structure terminal 202 is electrically coupled to metal test coupon 004 via metal test terminals 209 and 211, where metal test terminal 209 is coupled to the structure terminal 202 via switch 401D and to metal test terminal 211 via inline resistor 501D. Structure terminal 202 is also electrically coupled to metal test coupon 005 via metal test terminals 210 and 212, where metal test terminal 210 is coupled to the structure terminal 202 via switch 401E and to metal test terminal 212 via inline resistor 501E. In FIG. 3, metal test terminals 211 and 212 may be electrically coupled to each other via an inline resistor 501F. As a result of the above-described configuration, the underground structure 101 may be electrically coupled to the structure terminals 201 and 202 as well as to any one of the metal test coupons 001-005, as desired. Accordingly, any voltages or currents flowing between the underground structure 101 and any one of the test coupons 001-005 may be tested and measured as desired.

FIG. 3 further illustrates the reference cell terminal 215 electrically coupled to a reference cell 301. Accordingly, any voltages flowing through any of the above circuit configurations may be measured with respect to the reference cell 301, so as to provide a consistent baseline of voltage measurements. Although FIG. 3 does not show connections between the reference cell terminal 215 and any other circuit, it is understood that any voltages and currents measured for each of the circuits illustrated in FIG. 3 are measured with respect to the reference cell 301 and connected thereto via the reference cell terminal 215.

Also in FIG. 3, a native circuit, which is a circuit that is unconnected to the underground structure 101, includes native metal terminals 213 and 214, and native coupons 006 and 007. Native coupons 006 and 007 may have, e.g., dissimilar metals. The metal native terminal 213 may be directly electrically coupled to the native coupon 006, and may be coupled to the native metal terminal 214 via inline resistor 501G. The native metal terminal 214 may be electrically coupled to the native coupon 007 via switch 401F. Accordingly, any voltages and currents measured, with respect to the reference cell 301, for the above native circuit, are indicative of the state of the unprotected mixed-metal structure 101 as buried or submerged in the electrolyte.

In FIGS. 2 and 3, the test head terminal block 000 and the circuits that include the structure terminals 201 and 202 may be coupled to a processor 150 that includes, e.g., a memory 130. Accordingly, operation of the circuits discussed may be controlled via operation of the processor 150 and the memory 130.

Figure 4:
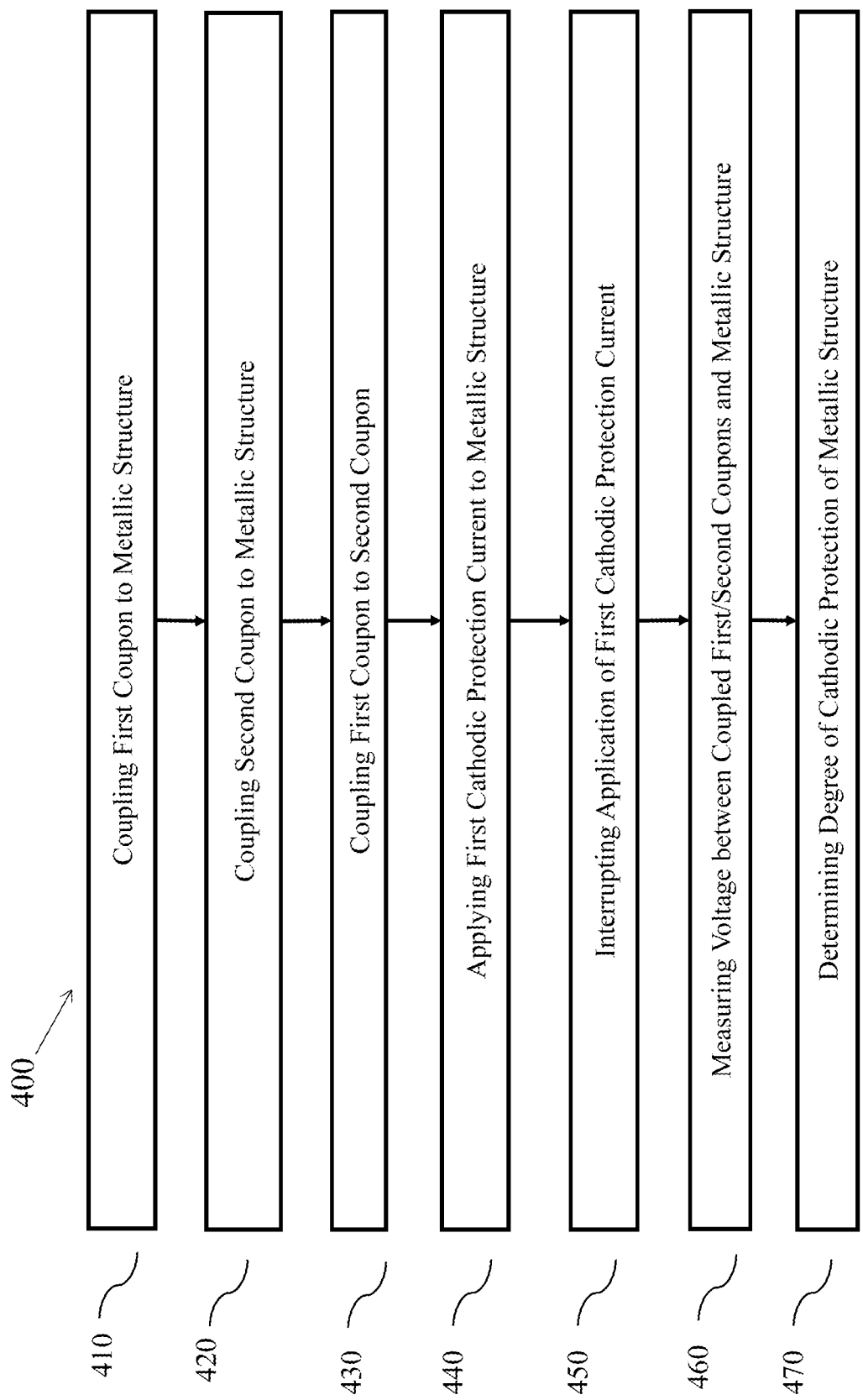
FIG. 4 is a flow chart illustrating a method of measuring cathodic protection of a metallic structure using a plurality of coupons, in accordance with various examples of the disclosure.

FIG. 4 is a flow chart illustrating a method of measuring cathodic protection of a metallic structure using a plurality of coupons, in accordance with various examples of the disclosure. The metallic structure may be, e.g., an underground pipeline buried or submerged in a soil or electrolyte. The method 400 includes operation 410, which includes electrically coupling a first coupon to the metallic structure. The first material may be or include a same material as the metallic structure. For example, the first material may be or include stainless steel such as, e.g., 316 steel. Operation 420 includes electrically coupling a second coupon to the metallic structure, and may include a second material that is more or less noble than the first material. For example, the second material may be or include copper. With reference to FIG. 2, operations 410 and 420 may be performed by coupling coupons 004 and 005 to the underground or submerged metallic structure 101 by closing switches 401D and 401E, respectively. Operation 430 includes electrically coupling the first coupon to the second coupon. With reference to FIG. 2, operation 430 may be performed by coupling coupon 004 with coupon 005 via the resistor 501F. Operation 440 includes applying a first cathodic protection current to the metallic structure. For example, applying the first cathodic protection current includes applying stepwise increases in the first cathodic protection current.

Operation 450 includes interrupting the application of the first cathodic protection current. Operation 460 includes, subsequent to interrupting the application of the first cathodic protection current, measuring the voltage between the electrically coupled first and second coupons, metallic structure and the reference cell, respectively. In various examples, prior to measuring the voltage between the electrically coupled first and second coupons, operation 460 includes measuring a first voltage of the first coupon with respect to the reference cell, and measuring a second voltage of the second coupon with respect to the reference cell, both measurements being performed while the application of the first cathodic protection current is interrupted. With reference to FIG. 3, operation 460 may be performed via reference cell terminal 215 coupled to the reference cell 301, so that the voltages are measured with respect to reference cell 301. Measuring the voltage may be performed within a given period of time such as, e.g., a period of time in a range of 0.1 second to 0.5 second, after the interruption of the application of the first cathodic protection current. The measured voltage may be a direct current (DC) voltage.

Operation 470 includes determining whether a degree of cathodic protection applied to the metallic structure is sufficient based on the measured voltage, subsequent to the interruption of cathodic protection current. When the measured voltage is equal to or more negative than −0.850 V, then during operation 470, the degree of cathodic protection is determined to be sufficient. When the measured voltage is more positive than −0.850 V, then the method 400 further includes applying a second cathodic protection current to the metallic structure, the second cathodic protection current being greater than the first cathodic protection current. Applying the second cathodic protection current may include applying a stepwise increase in the second cathodic protection current. When the second cathodic protection current is applied, the method 400 further includes interrupting the application of the second cathodic protection current, and may further include repeating operations 460-470. Measuring the second voltage may be performed within a given period of time such as, e.g., a period of time in a range of 0.1 second to 0.5 second, after the interruption of the application of the second cathodic protection current.

In examples, the method 400 further includes measuring a structure-to-electrolyte voltage between the structure and another reference cell at a second location of the structure, calculating a difference between the structure-to-electrolyte voltage and the third voltage, and determining a level of cathodic protection of the structure at the second location based on the calculated difference as discussed above with respect to operations 410-470.

Figure 5:
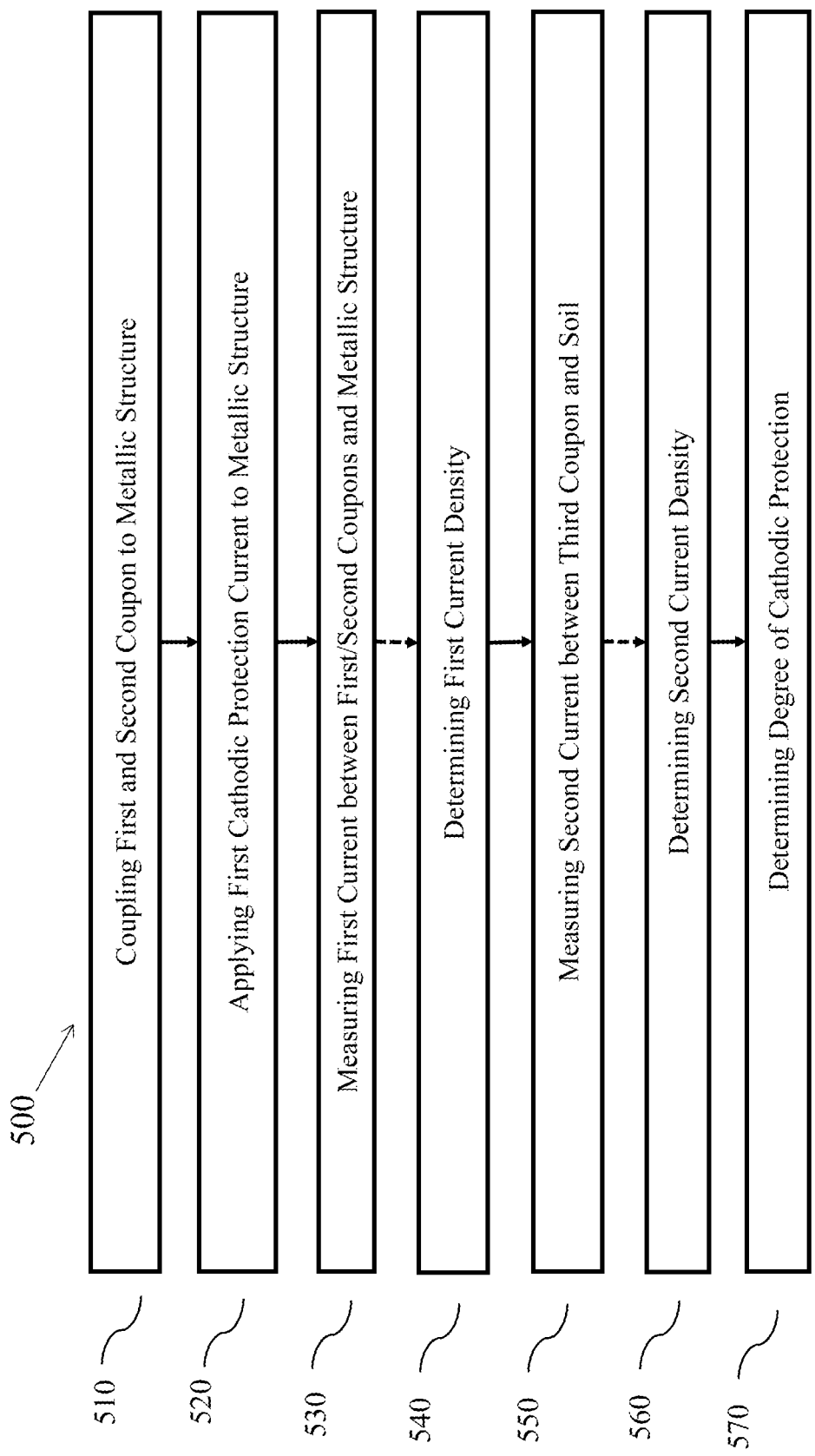
FIG. 5 is a flow chart illustrating a method of measuring cathodic protection of a metallic structure using a plurality of coupons, in accordance with various examples of the disclosure.

FIG. 5 is a flow chart illustrating a method of measuring cathodic protection of a metallic structure using a plurality of coupons, in accordance with various examples of the disclosure. The method 500 includes operation 510, which includes electrically coupling a first coupon and a second coupon to the metallic structure, the first coupon and the metallic structure including a same first material, and the second coupon including a second material that is more or less noble than the first material. With reference to FIG. 2, operation 510 may be performed by coupling coupons 001 and 002 to the structure 101. In various examples, before electrically coupling the first coupon and the second coupon to the metallic structure, operation 510 includes measuring a current flowing to the first coupon and determining a current density of the current flowing to the first coupon based on the measured current, and measuring a current flowing to the second coupon and determining a current density of the current flowing to the second coupon based on the measured current. Once the above discussed current densities are determined, a current flow may be increased and applied to the first and second coupons such that the current densities for both coupons are substantially equal to each other. In this case, substantially equal may refer to a difference that is equal to or less than 10%.

Operation 520 includes applying a first cathodic protection current to the metallic structure. In the case of multiple applications of cathodic current, applying the first cathodic protection current includes, or may be performed by, applying a plurality of stepwise increases to the first cathodic protection current. Operation 530 includes contemporaneously, concurrently or simultaneously, measuring a first current flowing between the coupled first coupon and second coupon and the metallic structure. With reference to FIG. 3, operation 530 includes measuring the current via a calibrated measurement resistor. When the applied first current is an applied stepwise current, then operation 530 includes measuring the first current and calculating the first current density for each stepwise increase.

Operation 540 includes determining a first current density based on the measured first current. For example, determining the first current density may include calculating the current density by dividing the measured current with the surface area of the first coupon. Operation 550 includes contemporaneously, concurrently or simultaneously, measuring a second current flowing between a second coupon and or other electrolyte via the reference cell, and measuring what should be zero current flow to the third coupon, native in characteristic, being unconnected to the metallic structure and including the first material. During operation 550, when a plurality of stepwise increases in the first cathodic protection current are applied, operation 550 includes measuring the second and subsequent current flow for each stepwise increase. Operation 560 includes determining a second and subsequent current density based on the measured second and subsequent current flows. For example, determining the second current density may include calculating the current density by dividing the measured current with the surface of the first coupon. The same set of steps may also be performed using the second coupon, of a different metal than the first coupon. Operation 570 includes determining whether a degree of cathodic protection of the metallic structure is sufficient based on the calculated first current density, and the calculated second current density, depending on the types of metal involved and their protection criteria to be applied. For example, operation 570 includes determining that the degree of cathodic protection of the metallic structure is sufficient when the first coupon current density is substantially equal to the second coupon current density, and the less noble metal shows adequate protection based on the measured voltages found at each particular rate of current flow.

Operation 570 may further include calculating a difference between the first coupon current density and the second coupon current density, and when the calculated difference between the first current density and the second current density is equal to or less than the absolute value of 10% of the first current density, the degree of cathodic protection of the metallic structure is determined to be sufficient. When the difference between the first current density and the second current density is greater than 10%, as the more noble coupon will have a greater current density applied than the less noble coupon, then operation 570 further includes applying a second cathodic protection current to the metallic structure, the second cathodic protection current being greater than the first cathodic protection current. Applying the second cathodic protection current may include applying a stepwise increase compared to the first cathodic protection current. As increased currents are applied, voltage measurements are also taken, to track the changes in effectiveness of cathodic protection at each coupon.

Figure 6:
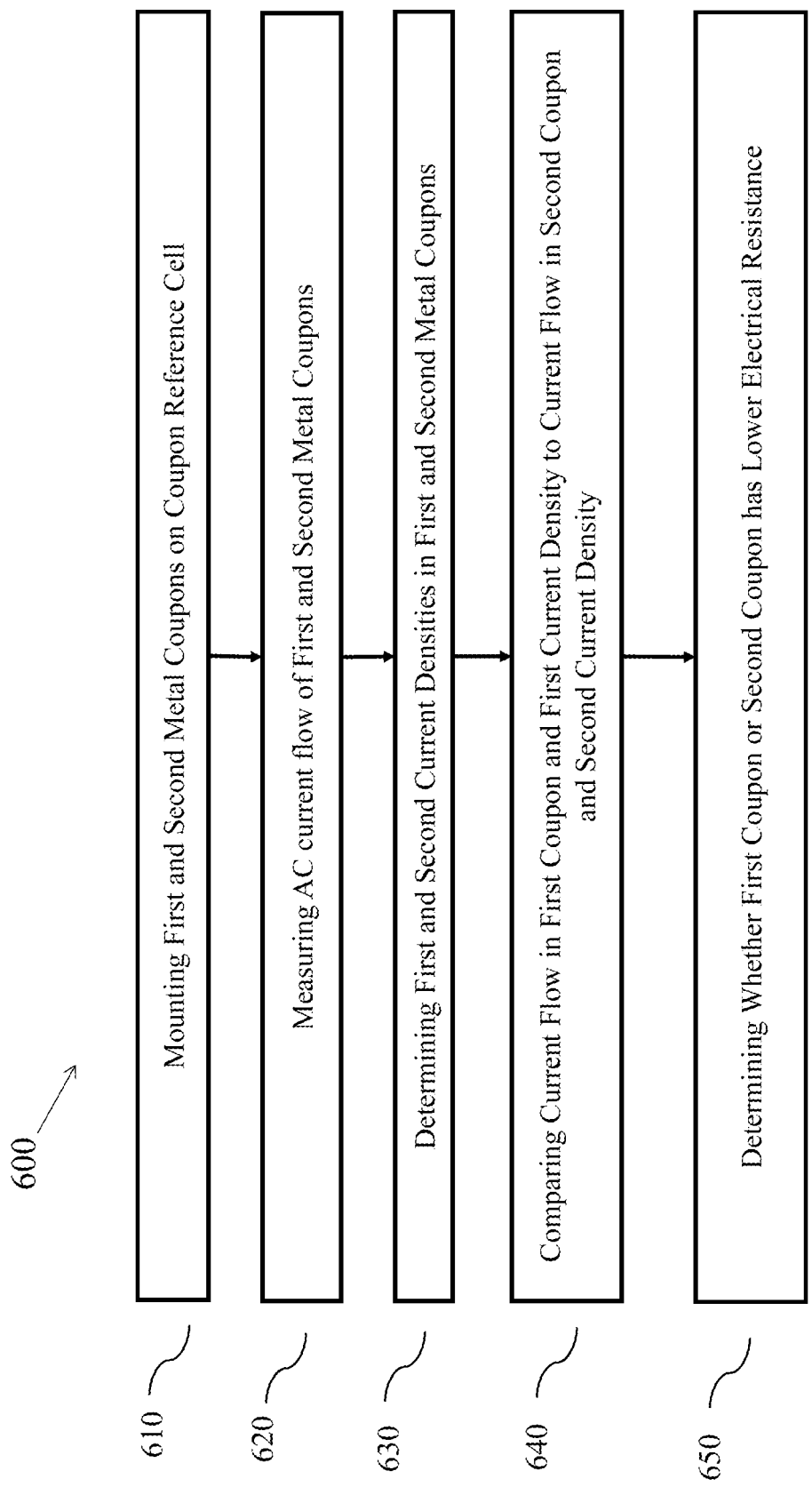
FIG. 6 is a flow chart illustrating a method of measuring a flow of AC current from a metallic structure to an electrical grounding structure using a plurality of coupons on a stationary reference cell, in accordance with various examples of the disclosure.

FIG. 6 is a flow chart illustrating a method of measuring a flow of AC current from a metallic structure to an electrical grounding structure using a plurality of coupons coupled to a stationary reference cell, in accordance with various examples of the disclosure. The method 600 includes operation 610, which includes mounting a first metal coupon and a second metal coupon on a coupon reference cell. Operation 610 also includes placing the coupon reference cell adjacent to the metallic structure, which may be a specialty AC mitigation media often formed of either zinc ribbon or of bare copper cable, the first coupon being electrically connected to the specialty mitigation media and including a first material, the second metal coupon being electrically connected to the specialty mitigation media and including a second material. Operation 620 includes measuring an AC current flow of the first coupon and of the second coupon.

Operation 630 includes determining a first current density and a second current density based on the measured first current flow and second current flow, respectively. Operation 640 includes comparing the measured AC current flow of the first coupon and the determined first current density to the measured AC current flow of the second coupon and the determined second current density, and continuing to perform these measurements and calculations over a period of time. Operation 650 includes determining which of the first coupon and the second coupon represents a lower-electrical-resistance grounding structure over time and mitigation service based on the comparisons performed during operation 640.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art may recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of measuring cathodic protection of a metallic structure using a plurality of coupons, the method comprising:
    electrically coupling a first coupon to the metallic structure, the first coupon comprising a first material;
    electrically coupling a second coupon to the metallic structure, the second coupon comprising a second material;
    applying a first cathodic protection current to the metallic structure;
    interrupting the application of the first cathodic protection current;
    measuring a first voltage of the first coupon with respect to a reference cell, while the application of the first cathodic protection current is interrupted;
    measuring a second voltage of the second coupon with respect to the reference cell while the application of the first cathodic protection current is interrupted;
    electrically coupling the first coupon to the second coupon;
    measuring a third voltage between the electrically coupled first and second coupons and the metallic structure while the application of the first cathodic protection current is interrupted with respect to the reference cell; and
    determining whether a degree of cathodic protection applied to the metallic structure is sufficient based on the measured third voltage.

2. The method of claim 1, further comprising:
    measuring a structure-to-electrolyte voltage between the structure and another reference cell located at a second location of the structure, the second location being isolated from a first location of the reference cell;
    calculating a difference between the structure-to-electrolyte voltage and the third voltage; and
    determining a level of cathodic protection of the structure at the first location of the reference cell and at the second location of the other reference cell based on the calculated difference.

3. The method of claim 1, wherein measuring the third voltage is performed within a given period of time after interrupting the application of the first cathodic protection current.

4. The method of claim 1, wherein when the measured third voltage is equal to or more negative than −0.850 V, the degree of cathodic protection is determined to be sufficient.

5. The method of claim 1, wherein when the measured third voltage is more positive than −0.850 V, the method further comprises:
    applying a second cathodic protection current to the metallic structure, the second cathodic protection current being greater than the first cathodic protection current.

6. The method of claim 5, further comprising:
    interrupting the application of the second cathodic protection current; and
    measuring a second voltage between the electrically coupled first and second coupons and the reference cell.

7. The method of claim 6, wherein measuring the second voltage is performed within a given period of time after interrupting the application of the second cathodic protection current.

8. The method of claim 1, wherein the first material comprises the same material as a material of the metallic structure.

9. A method of measuring an effectiveness of cathodic protection applied to a metallic structure using a plurality of coupons, the method comprising:
    electrically coupling a first coupon and a second coupon to the metallic structure, the first coupon and the metallic structure comprising a first material, and the second coupon comprising a second material that is one of less noble and more noble than the first material;
    applying a first cathodic protection current to the metallic structure;
    contemporaneously measuring a polarity and magnitude of a first current flowing between the coupled first coupon and the metallic structure;
    contemporaneously measuring a polarity and magnitude of a second current flowing between the coupled second coupon and the metallic structure; and
    determining whether a degree of cathodic protection of the metallic structure is sufficient based on one of the determined polarity and magnitude of the first current and the determined polarity and magnitude of the second current.

10. The method of claim 9, wherein the degree of cathodic protection is determined to be sufficient when the polarity and magnitude of the first current is substantially equal to the polarity and magnitude of the second current.

11. The method of claim 9, wherein:
    applying the first cathodic protection current comprises applying a plurality of stepwise increases in the first cathodic protection current; and
    measuring the polarity and magnitude of the first current comprises measuring the polarity and magnitude of the first current for each stepwise increase.

12. The method of claim 9, wherein:
measuring the magnitude of the first current comprises determining a first current density based on the measured magnitude of the first current; and
measuring the magnitude of the second current comprises determining a second current density based on the measured magnitude of the second current.

13. The method of claim 12, wherein when a difference between the first current density and the second current density is equal to or less than 10% of the first current density, the degree of cathodic protection of the metallic structure is determined to be sufficient.

14. The method of claim 12, wherein when a difference between the first current density and the second current density is greater than 10%, the method further comprises:
applying a second cathodic protection current to the metallic structure, the second cathodic protection current being greater than the first cathodic protection current.

15. The method of claim 12, further comprising, before electrically coupling the first coupon and the second coupon:
measuring a third current flowing to the first coupon and a fourth current flowing to the second coupon; and
determining a third current density based on the measured third current and a fourth current density based on the measured fourth current.

16. The method of claim 15, further comprising, before electrically coupling the first coupon and the second coupon:
applying a current to the second coupon such that the third current density and the fourth current density are substantially equal to each other.

17. The method of claim 9, further comprising:
contemporaneously measuring a magnitude of a third current flowing between a third coupon and soil, the third coupon being unconnected to the metallic structure, to the first coupon and to the second coupon, and comprising the first material;
contemporaneously measuring a magnitude of a fourth current flowing between a fourth coupon and soil, the fourth coupon being unconnected to the metallic structure, to the first coupon and to the second coupon, and comprising the second material; and
determining whether a degree of cathodic protection of the metallic structure is sufficient based on one of the determined magnitude of the third current and the determined magnitude of the fourth current.

18. An arrangement for measuring cathodic protection of a metallic structure, the arrangement comprising:
a first coupon electrically coupled to the metallic structure via at least one first switch, the first coupon being electrically connected to a reference cell and comprising a first material;
a second coupon electrically coupled to the first coupon and to the metallic structure via at least one second switch, the second coupon being electrically connected to the reference cell and comprising a second material;
a third coupon being unconnected to the metallic structure, to the first coupon and to the second coupon and comprising the first material;
a fourth coupon being unconnected to the metallic structure, to the first coupon and to the second coupon and comprising the second material;
a current source configured to apply a cathodic protection current to the metallic structure; and
a voltage measuring device configured to measure a voltage between the coupled first and second coupons and the metallic structure with respect to the reference cell, between the third coupon and the metallic structure, and between the fourth coupon and the metallic structure.

19. The arrangement of claim 18, wherein the first material comprises the same material as a material of the metallic structure.

20. The arrangement of claim 18, wherein the second material comprises a different material than the material of the metallic structure.

21. The arrangement of claim 18, wherein the second material comprises a material that is more noble than the material of the metallic structure.

22. A cathodic protection system comprising:
the arrangement of claim 18,
a processor coupled to the arrangement;
a memory coupled to the processor, the memory storing instructions that, when executed by the processor, performs a set of operations comprising:
applying, via the current source, the first cathodic protection current to the metallic structure;
interrupting, via the processor, the application of the first cathodic protection current;
measuring, via the voltage measuring device, the voltage; and
determining, via the processor, whether a degree of cathodic protection of the metallic structure is sufficient based on the measured voltage.

23. The system of claim 22, wherein when the measured voltage is equal to or more negative than −0.850 V, the degree of cathodic protection is determined to be sufficient.

24. The system of claim 22, wherein when the measured voltage is more positive than −0.850 V, the set of operations further comprises:
applying a second cathodic protection current to the metallic structure, the second cathodic protection current being greater than the first cathodic protection current.

25. The system of claim 24, wherein the set of instructions further comprises:
interrupting the application of the second cathodic protection current; and
measuring a second voltage between the electrically coupled first and second coupons and the metallic structure, between the third coupon and the metallic structure, and between the fourth coupon and the metallic structure.

26. The arrangement of claim 22, further comprising:
a current measuring device configured to measure a first current flowing between the coupled first and second coupons and the metallic structure, and calculating a first current density for the coupled first and second coupons and the metallic structure based on the measured first current; wherein
the current measuring device is further configured to measure a second current flowing between the third coupon and soil; and calculating a second current density for the third coupon based on the measured first current and
the current measuring device is further configured to measure a third current flowing between the fourth and soil.

27. A cathodic protection system comprising:
the arrangement of claim 26,
a processor coupled to the arrangement;
a memory coupled to the processor, the memory storing instructions that, when executed by the processor, performs a set of operations comprising:

applying, via the current source, the cathodic protection current to the metallic structure;

contemporaneously measuring, via the current measuring device, the first current and calculating the first current density;

contemporaneously measuring, via the current measuring device, the second current and calculating the second current density;

determining, via the processor, whether a degree of cathodic protection of the metallic structure is sufficient based on the calculated first current density and the calculated second current density.

28. The system of claim 27, wherein when a difference between the first current density and the second current density is equal to or less than 10% of the first current density, the degree of cathodic protection of the metallic structure is determined to be sufficient.

29. The system of claim 27, wherein when a difference between the first current density and the second current density is greater than 10% of the first current density, the set of operations further comprises:

applying a second cathodic protection current to the metallic structure, the second cathodic protection current being greater than the first cathodic protection current.

30. A method of measuring a flow of AC current from a metallic structure to an electrical grounding structure using a plurality of coupons coupled to a stationary reference cell, the method comprising:

mounting a first metal coupon and a second metal coupon on a coupon reference cell, wherein each of the first metal coupon and the second metal coupon is separately grounded to soil, the first coupon and the second coupon forming separate and parallel grounding structures;

placing the coupon reference cell adjacent to the metallic structure, the first coupon being electrically connected to ground and comprising a first material, the second metal coupon being electrically connected to the ground and comprising a second material;

measuring an AC current flow of the first coupon and of the second coupon;

determining a first current density and a second current density based on the measured first current flow and second current flow, respectively;

comparing the measured AC current flow of the first coupon and the determined first current density to the measured AC current flow of the second coupon and the determined second current density; and determining which of the first coupon and the second coupon represents a lower-electrical-impedance grounding structure based on the comparison.

* * * * *